Dec. 23, 1969 R. F. OXLEY 3,486,034

MULTIPLE SOCKET PATCHBOARDS

Filed April 4, 1968 7 Sheets-Sheet 1

-FIG. 3-

United States Patent Office 3,486,034
Patented Dec. 23, 1969

3,486,034

MULTIPLE SOCKET PATCHBOARDS

Robert F. Oxley, Priory Park, Ulverston, Lancashire, England

Filed Apr. 4, 1968, Ser. No. 718,866
Claims priority, application Great Britain, Oct. 20, 1967, 47,779/67
Int. Cl. H02j *1/00, 3/00*
U.S. Cl. 307—41 21 Claims

ABSTRACT OF THE DISCLOSURE

This invention concerns a scanning device for scanning the rows or columns of a multiple socket patchboard. The scanning is effected by changing the potential on the scanned row or column contact element. The potential change is achieved by electro-magnetically operable switch means such as a uniselector type stepping switch or may be achieved by means of solid state switching devices. Preferably, means is provided to arrest scanning at any desired row or column and reset the scanning device to the initial scanning position. Furthermore one or more rows or columns may be skipped during each scanning interval by appropriate adjustment of the scanning device.

Figure 1:
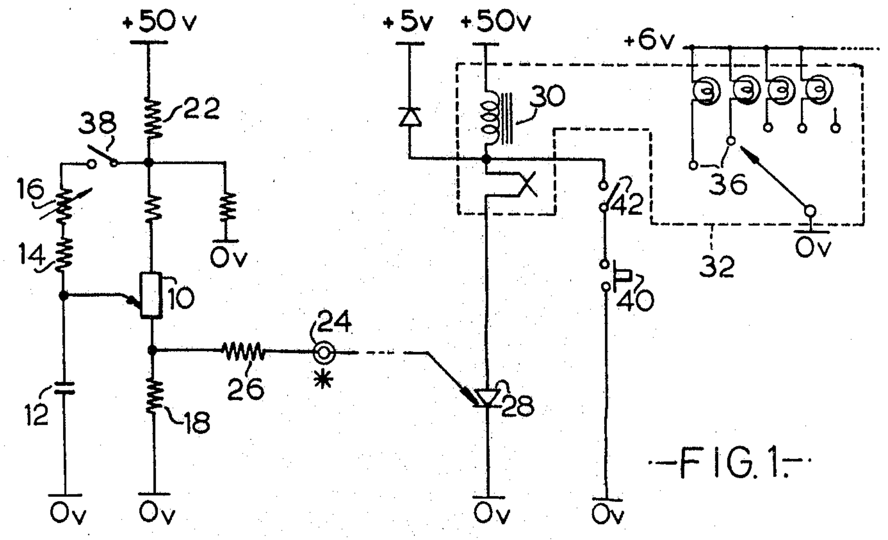

The device also employs means for varying the time interval of each scan.

This invention concerns multiple socket patchboards commonly referred to as matrix programme boards. Such a device is the subject of British Patent No. 1,081,171. It is an object of this invention to provide a device whereby the rows (or columns) of sockets in a patchboard may be scanned electrically.

It will be appreciated that if an electrical potential is applied in a step-by-step manner to the contact elements of the columns of a patchboard this potential will appear on the contact elements of the rows of the patchboard which are linked to the columns by shorting plugs. Thus if the intersection of column 3 and row 7 is shorted by a shorting plug, an electrical potential will appear on the contact element which extends along the row 7 when a potental is applied to the contact element corresponding to column 3. A potential will also simultaneously appear on any other contact element whose intersection with the contact element of column 3 is bridged by a shorting plug.

Voltage sensitive switching devices or the like connected to selected rows of the contact elements of the rows will be triggered as the potential is applied to the column contact elements whose intersection with the selected rows are shorted.

According to the present invention, a scanning device for applying a potential in a step-by-step manner to the contact elements of the rows or columns of a multiple socket patchboard comprises electrical pulse generating circuit means, a pulse counting device for counting successive pulses therefrom and switch means responsive to the counting device for establishing a separate electric signal path between a common source of potential and each contact element of the rows or columns of the patchboard in turn, as successive pulses are counted by said counting device.

The pulse counting device may be an electro-magnetic stepping switch of the Uniselector type, or a relay bank or a ring counting circuit employing thermionic valves or semi-conductors.

Preferably visual indicating means such as an indicator lamp is associated with each signal path to indicate which contact element of the row or column is being scanned at any instant.

The pulse generator may be arranged to produce pulses repetitively so that the counting circuit means is stepped repeatedly. Alternatively it may be arranged so that a pulse is produced each time a switch is operated.

According to another aspect of the invention, means is provided for varying the time interval between successive pulses. In this way the scanning interval for each row or column can be different if required.

According to a further aspect of the invention, means is provided for generating a second pulse immediately following a previously produced pulse when the previously produced pulse establishes a signal path to a selected one or selected ones of the contact elements in the rows or columns, thereby to cause the scanner to immediately transfer to the next adjacent contact element. By arranging that the second pulse is produced with the minimum of delay, the scanner effectively skips over the selected one or ones of the contact elements.

According to a still further aspect of the invention, means is provided to generate additional pulses to operate the counting device and thereby the switch means repetitively until the scanning device has scanned all the contact elements following a selected one of said contact elements and has reset in readiness to begin scanning from the beginning again. Preferably the additional pulses are produced with much reduced time interval between pulses as compared with the pulse time interval of the normal scanning operation, so as to reduce the reset time to a minimum.

The invention also consists in the combination of a scanning device of the type defined and a multiple socket patchboard.

Figure 2:
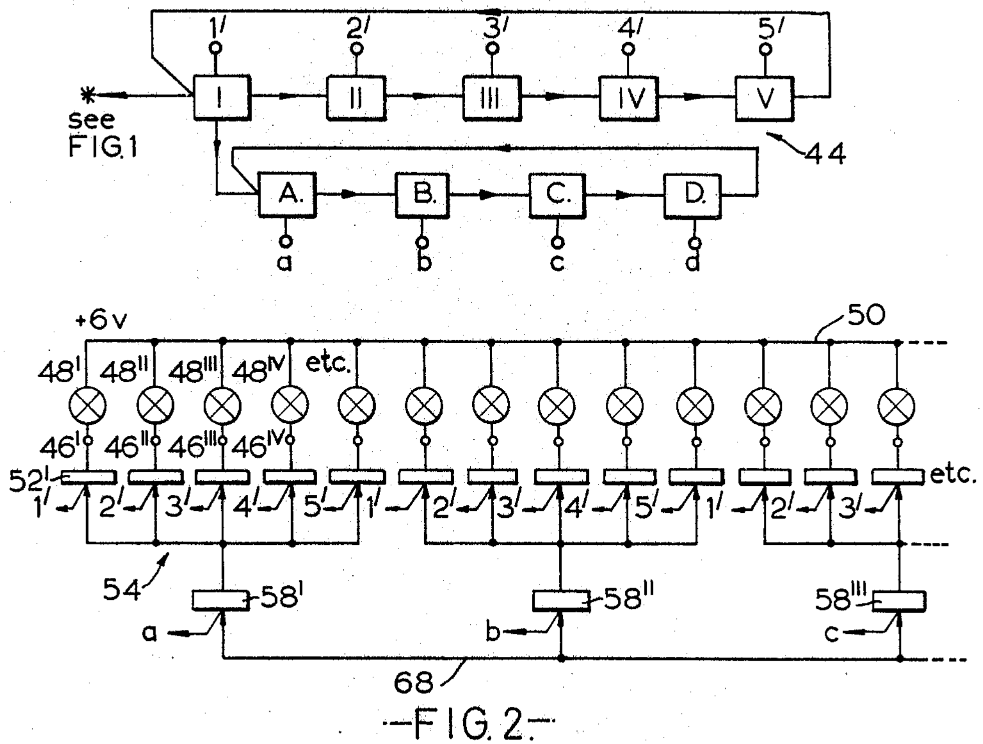
Figure 3:
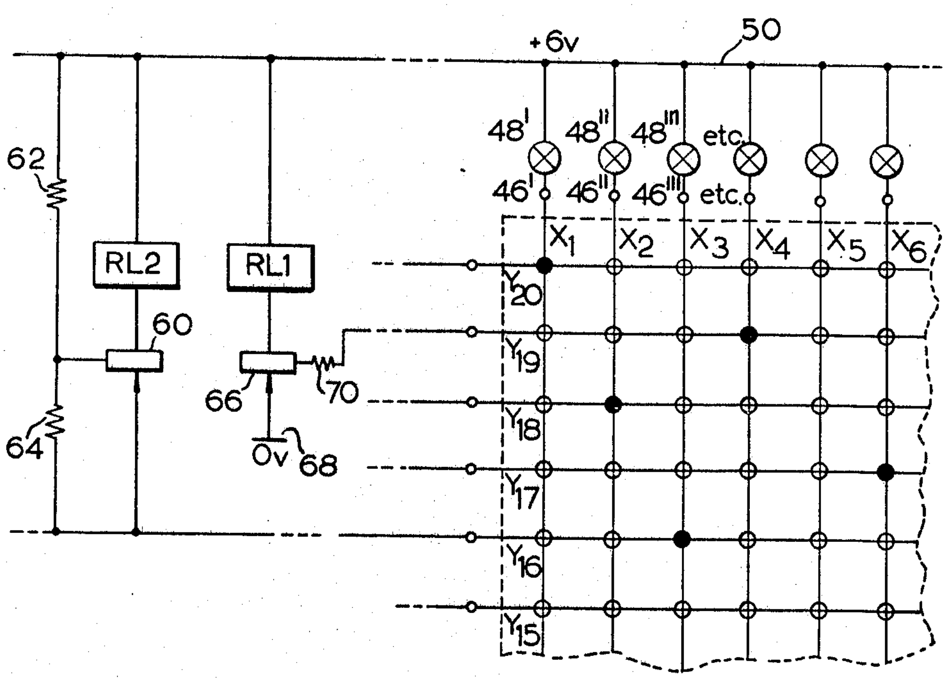
Figure 4:
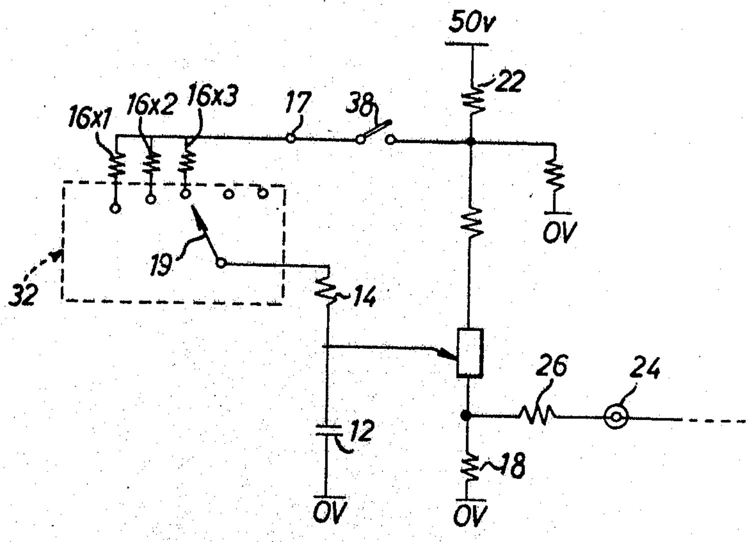
Figure 5:
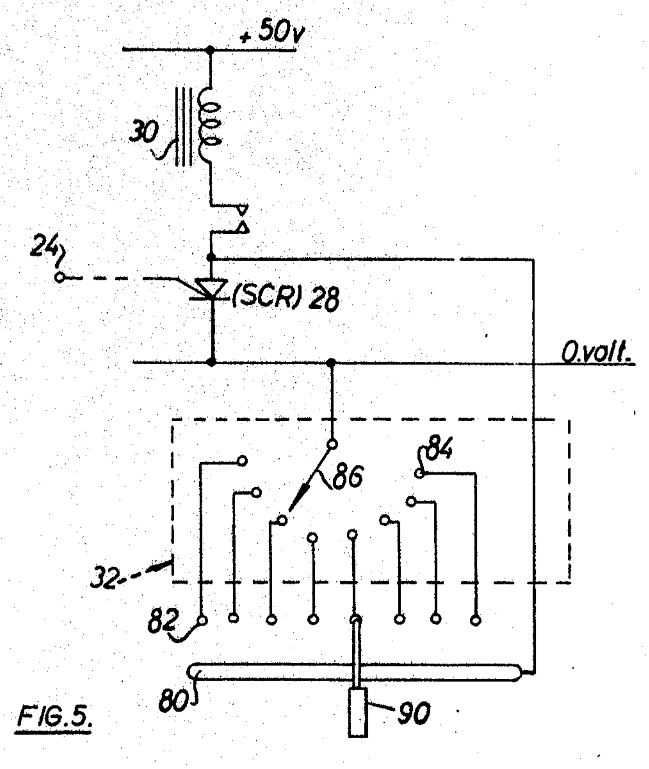

The invention will now be described by way of example with reference to the accompanying drawings, in which:

FIG. 1 is a schematic circuit diagram of part of a scanning device embodying the invention, which employs a Uniselector type of stepping switch, FIG. 2 is a part block-schematic circuit diagram of part of a scanning device embodying the invention which employs a ring counting circuit, FIG. 3 is a part schematic, part circuit diagram illustrating the way in which the scanning device, in combination with a patchboard, may be employed to control the state of a number of semi-conductor gates, FIG. 4 corresponds to part of FIG. 1 and illustrates a device for varying the time interval between pulses applied to the stepping switch, FIG. 5 also corresponds to part of FIG. 1 and illustrates a device for skipping over selected ones of the contact elements in the rows or columns.

Figure 6:
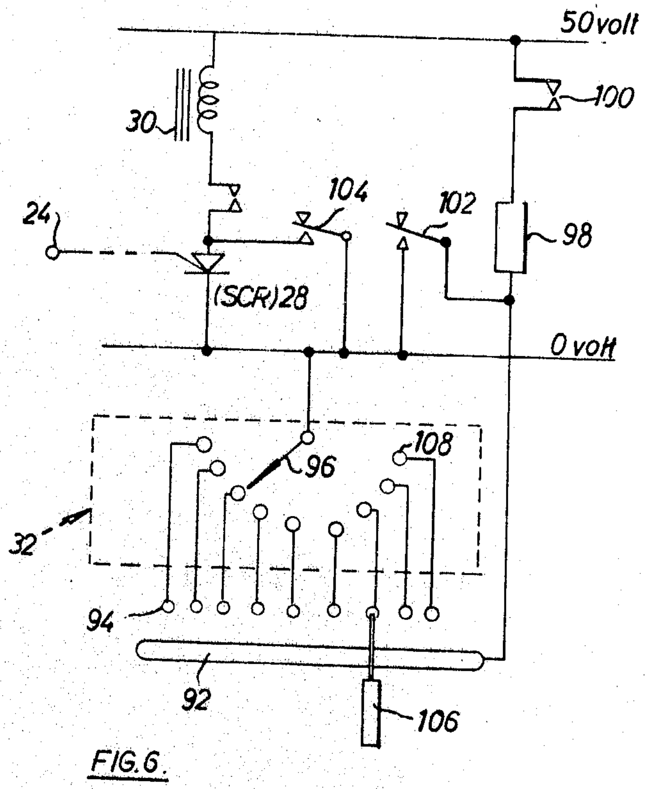
Figure 7:
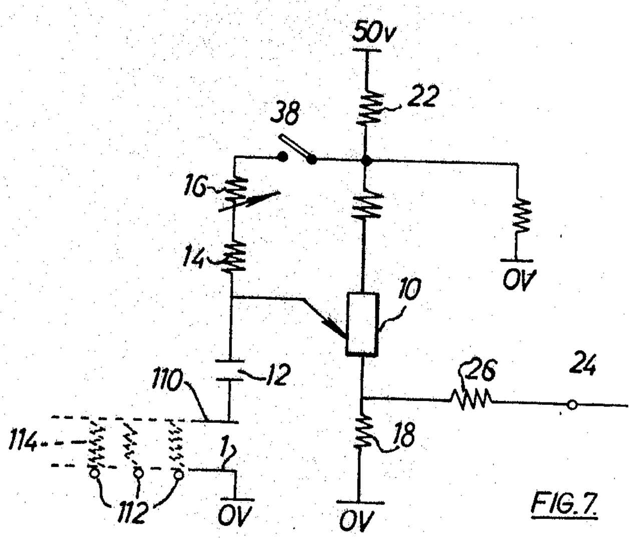
Figure 8:
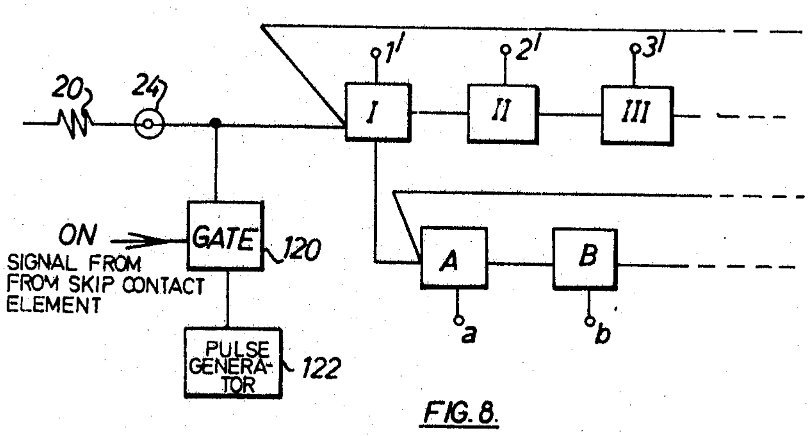
Figure 9:
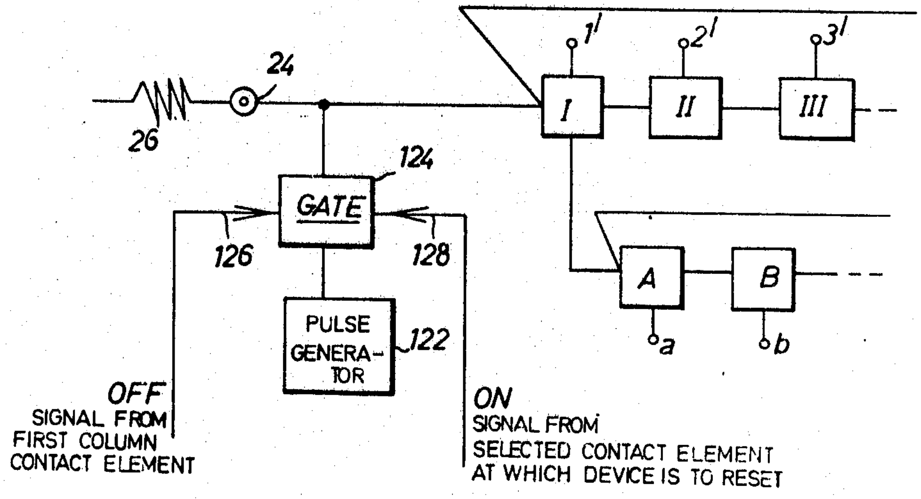

FIG. 6 also corresponds to part of FIG. 1 and illustrates a device for resetting the stepping switch from a selected one of the contact elements, and FIGS. 7, 8 and 9 respectively show scanning interval duration control, "skipping" of selected ones of the scanned contact elements and resetting of the scanning device from a selected contact element as applied to scanning devices employing a semi-conductor ring-counting circuit and semi-conductor decoder and gating circuit, constituting the switching means.

Figure 10:
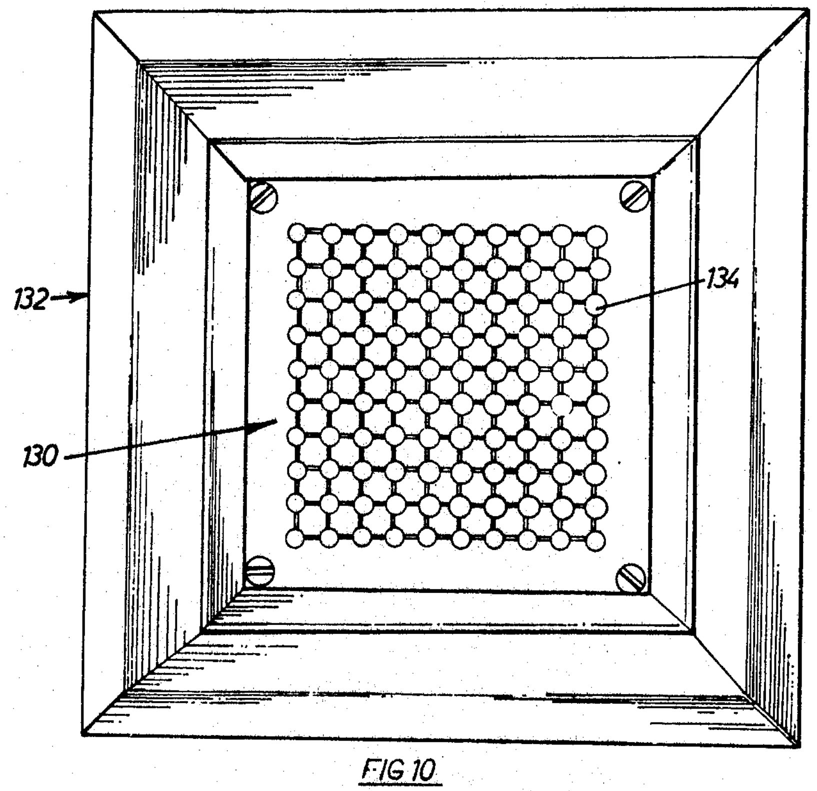
Figure 11:
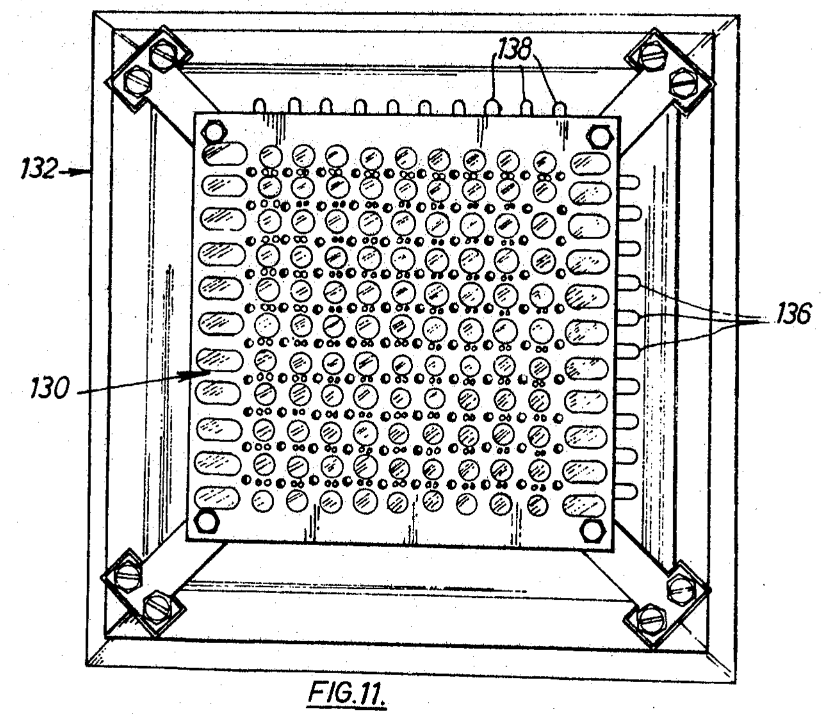
Figure 12:
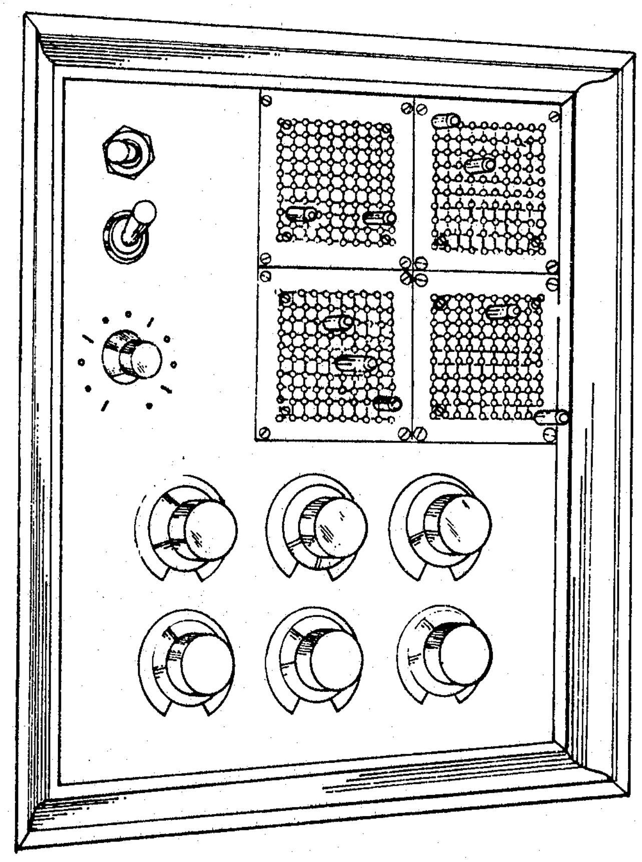

FIG. 10 is a front plan view of a single 10 x 10 patchboard unit mounted in a frame, to which the invention can be applied, FIG. 11 is a rear plan view thereof, and FIG. 12 is a perspective view of a machine tool control panel employing four 10 x 10 patchboard to form a 20 x 20 matrix and associated controls for scanning in accordance with the invention.

In FIG. 1 a pulse generator is shown which is based on a transistor 10 having a characteristic which is similar to that of a gas-filled thermionic triode valve, this type of transistor commonly being referred to as a trigger junction. The control voltage for the control electrode of the junction 10 is developed across a capacitor 12, the charging current being controlled by a series resistance composed of a fixed value resistor 14 and a variable resistor 16. One side of the junction 10 is connected through a load resistor 18 to a common bus bar at zero volts while the other side of the junction is connected through load resistors 20, 22 to a common bus bar at a positive potential relative to the first bus bar of 50 volts. The voltage drop across the load resistor 18 forms the output signal of the pulse generator since this voltage will be zero until the voltage across the capacitor 12 has risen to the level required to trigger the junction 10 into conduction, when the voltage across resistor 18 will rise rapidly to a value determined by the value of resistor 18 and the junction current flowing. This output voltage is applied to an output terminal 24 through a resistor 26.

It will be appreciated that as soon as the junction 10 is triggered into conduction, "base current" will flow, this current being supplied from the charge on the capacitor 12, so that the latter discharges. As charge on the capacitor 12 decreases the voltage on the trigger control electrode drops until it is below that required to maintain conduction in the junction 10 when the cycle is repeated. The discharge time is governed by the "base/collector" resistance of the junction 10 and is therefore substantially fixed, while the charging time is controlled by the time constant of the charging circuit for capacitor 12, which is adjustable by adjusting the value of resistor 16.

The voltage appearing at output terminal 24 is applied to the control electrode of a silicon controlled rectifier 28 (hereinafter referred to as an S.C.R.), which is connected in series with the energising coil 30 of a Uniselector type stepping switch, generally designated 32, between the positive and zero potential bus bars.

The pulses from terminal 24 are arranged to be of sufficient magnitude to trigger the S.C.R. 28 into conduction for the duration of each pulse, so that the Uniselector 32 is stepped from one position to the next by each pulse. The sliding contact 34 of the Uniselector 32 is connected to the zero potential bus bar and the switch contacts 36 are connected through 6 volt lamps to a 6 volt bus bar, so that the switched position of the Uniselector 32 is shown by the appropriate lamp being illuminated. The switch contacts 36 are also connected to the contact elements of the rows or columns of a patchboard (not shown) so that zero potential is applied to the row (or column) corresponding to the lamp for the time being illuminated while the remaining rows (or columns) are held at positive (+6 volts) potential.

A switch 38 in the charging circuit of the capacitor 12 serves as an ON/OFF switch for the pulse generator.

A normally open push-button type switch 40 connected in parallel with the S.C.R. 28 serves as a control by which the Uniselector can be manually triggered. The switch 40 is connected in series with a switch 42 which is interlocked with switch 38 so that when one is open the other is closed. Switches 38 and 42 are arranged to be operated by a single toggle control by which the scanning device can be switched from automatic scanning to manual step-by-step operation.

In FIG. 2 a ring-type counting circuit, generally designated 44, is illustrated. The circuit is of conventional design and comprises a ring of five (I to V) counter and a ring of four (A to D) counter which latter is triggered by the operation of stage I in the ring of five counter so that the counting circuit has a total capacity of $5 \times 4 = 20$.

The pulses required to trigger the counting circuit are derived from a pulse generator of the type illustrated in FIG. 1 and accordingly the input of the counting circuit 44 is shown connected to the terminal 24 in FIG. 1.

Each stage of the ring counters is in the form of a bi-stable device and at any time four of the stages I to V and three of the stage A to D will be in one switched state indicated by zero potential on the terminals (1 to 5 and *a* to *d*) of those stages an the remaining stage of each ring will be in the other switched state indicated by a positive potential on the terminals of those stages. A decoding device is necessary in order to translate the switched states of the bi-stable devices into suitable form and the decoder is shown in the lower half of FIG. 2 and is generally designated 54. The scanning device illustrated is for use with a 20 x 20 patchboard and a part of such a patchboard is shown diagrammatically in FIG. 3. As will be seen by reference to this figure, each column contact element ($X_1$, $X_2$, $X_3$, etc.) is connected to one of twenty terminals 46′, 46″, etc. to which are connected twenty lamps 48′, 48″, etc. The lamps are connected between the terminals 46′, 46″, etc. and a common bus bar 50 (at +6 volts) and the terminals 46′, 46″, etc. are connected to the positive electrodes of twenty npn 3-terminal semiconductor junctions 52′, 52″ (hereinafter referred to simply as junctions 52′, 52″, etc.) which constitute a part of the decoder generally designated 54. The twenty junctions 52′, 52″, etc. are arranged in four groups of five and the negative electrodes of the junctions in each group connected to one of four intermediate bus bars 56′, 56″, etc. As will be seen by comparing FIGS. 2 and 3, starting with 52′, the junctions 52′, 52″, etc. are connected successively to column contact elements $X_1$, $X_2$, etc. of the patchboard, and the control electrodes of junctions 52′, $\mathbf{52}^{VI}$, $\mathbf{52}^{XI}$ and $\mathbf{52}^{XVI}$ are connected to terminal 1 of stage I of the ring of five counter, that of junction 52″, $\mathbf{52}^{VII}$, $\mathbf{52}^{XII}$ and $\mathbf{52}^{XVII}$ to terminal 2 of stage II, and so on. At the same time the four intermediate bus bars 56′, 56″, etc. are connected to the positive electrodes of four npn 3-terminal semi-conductor junctions (hereinafter referred to as junctions 58′, 58″, etc.) whose negative electrodes are connected to a common bus bar 68 (at zero volts). The control electrodes of the four junctions 58′, 58″, etc. are connected to terminals *a*, *b*, etc. of stages A, B, etc. of the ring of four counter, respectively.

In operation, the switched condition of the two counters for a count of (say) 3 is zero volts on terminals 1, 2, 4 and 5, and *b*, *c* and *d* and a positive potential on terminals 3 and *a*. This means that junction 52‴ and junction 58′ are controlled into conduction while all the remaining junctions 52 and 58 are non-conducting. Accordingly lamp 48‴ is illuminated and while all the remaining column contact elements $X_1$, $X_2$, etc. are held at +6 volts potential contact element $X_3$ is switched to substantially zero potential (assuming that the voltage drop across the two conducting junctions 52‴ and 58′ can be neglected).

The change of potential on the column contact elements is transferred to the row contact element (or elements) whose intersection (or intersections) therewith are shorted. In FIG. 3 such shorted intersections are denoted by solid black circles. The intersection of column $X_3$ and row $Y_{16}$ is shorted, so that in the example described above, the contact element of row $Y_{16}$ will go to zero potential when lamp 48‴ is illuminated. Use is made of this to operate a switching device which may be electromagnetic such as a relay. However, as shown in FIG. 3 the device is preferably an npn type 3-terminal semi-conductor junction 60 whose positive electrode is connected to the positive bus bar 50 through the energising coil of a relay $RL_2$ and whose negative electrode is connected to contact element $Y_{16}$. Base current is obtained by a resistor network 62, 64 connected between the positive bus bar 50 and the negative electrode of the junction 60. It will be appreciated that zero potential on contact element $Y_{16}$ will cause junction 60 to conduct and energise relay $RL_2$.

It will be appreciated that whereas it has been stated that the intersections between row and column contact elements is achieved by shorting plugs, in practice the plugs would include an appropriately polarised diode (not shown) to prevent interaction between rows and columns. The diodes are conveniently housed in the plug member substantially as shown in FIG. 4 of the drawings.

An alternative arrangement in which a relay $RL_1$ is deenergised on the application of zero volts to a contact element $Y_{19}$, is also shown in FIG. 3. In this alternative arrangement the positive electrode of an npn type 3-terminal semi-conductor junction 66 is connected to the positive bus bar 50 through the energising coil of relay $RL_1$ and the negative electrode is connected permanently to a bus bar 68 at zero volts. The control electrode is connected through a resistor 70 to the row contact element $Y_{19}$. While the latter is held at +6 v. potential, junction 66 will be held in its conducting state but on removal of the +6 volts from $Y_{19}$, as row $X_4$ is scanned, junction 66 is cut off and relay $RL_1$ temporarily deenergised.

Although not illustrated in FIG. 3, additional lamps may be connected to the contact elements $Y_{20}$, $Y_{21}$, etc. of the rows and to a common source of current, as for example bus bar 50. Appropriate connection of the diodes (not shown) in the shorting plugs (not shown) will then cause operation of a lamp connected to a row contact element which is shorted to a column contact element, when the latter is scanned.

FIG. 4 illustrates how a different scanning interval may be set for each scanning step. The interval is controlled by the charging rate of the capacitor 12 which is in turn regulated by the value of the charging resistor 14, 16 of FIG. 1. In FIG. 4 the variable resistor 16 of FIG. 1 is replaced by a number of pre-set (or fixed value) resistors $16_{X1}$, $16_{X2}$, $16_{X3}$, etc. which are all connected to a common junction 17 on the one hand and to the outlets of a bank of the rotary stepping switch 32 (see FIG. 1). The wiper 19 of the rotary stepping switch is connected to the resistor 14.

As the stepping switch steps around, the wiper 19 makes contact with the outlets of the switch bank in turn thereby connecting the resistors $16_{X1}$, $16_{X2}$, etc. successively in series with the resistor 14. The resistor for the time being selected by the wiper 19, in combination with the resistor 14, determines the charging resistance for the capacitor 12. Thus, by making the resistors $16_{X1}$, $16_{X2}$, etc. of appropriate and different values of resistance, the charging times and thus the duration of the intervals between pulses can be made to vary from one step to the next.

FIG. 5 shows an arrangement for use with an electromagnetic stepping switch 32 by which selected ones of the scanning steps can be skipped-over during scanning. The arrangement is shown coupled to the circuit of FIG. 1 and where appropriate the same reference numerals have been used to denote the components common to the two figures.

The arrangement consists of a common line 80 on the patchboard (not shown) with sockets 82, one socket for each row or column to be scanned, the sockets 82 connected to appropriate ones of the outlets 84 of a bank of the rotary switch 32, having a wiper 86 which is connected to the zero volt bus bar. The common line 80 is connected to the anode of the SCR 28.

Since the sockets 82 are electrically isolated one from the other and from the common line 80, the device will function as described with reference to FIG. 1 if no connection is made between the common line 80 and any of the sockets 82. If, however, a shorting plug 90 is inserted into one of the sockets 82 so as to complete the circuit from the appropriate outlet 84 on the wafer switch to the anode of the SCR 28, the SCR 28 will be short-circuited when the wiper 86 makes contact with the appropriate outlet 84 and the supply of operating current to the operating coil of the stepping switch will be maintained, allowing the switch to step once more.

It will be appreciated that if another plug 90 were inserted into the next socket 82, the switch would step twice before stopping. The arrangement thus causes the scanning device to skip over the contact elements of the rows or columns corresponding to the sockets 82 in which shorting plugs 90 are inserted.

A further arrangement is shown in FIG. 6 by which the stepping switch of FIG. 1 can be made to continue stepping after a selected scanning position has been reached, so as to reset the switch to its initial position. As in FIGS. 4 and 5, the same reference numerals have been used to denote components common to the two figures.

The arrangement is similar to that of FIG. 5, in that a common line 92 having sockets 94 is required preferably on the patchboard. Each socket corresponds to one scanning position, i.e. a row or column (as the case may be) of the patchboard. The sockets 94 which are electrically isolated from each other and from the common line 92, are connected to the outlets 108 of a bank of the stepping switch 32 having a wiper 96, which is connected to the zero volts bus bar. The common line 92 is connected through a relay coil 98 and a contact set 100 on the stepping switch 32 to the +50 volt bus bar. The contact set 100 is closed during stepping of the switch but opens at the end of a stepping cycle just before the switch steps to its first position. The relay has two normally open contact sets 102, 104, the first of which is connected between the common line 92 and the zero volts line, and forms a holding contact set for the relay once it has been operated, whilst the second contact set 104 is connected across the SCR 28.

With no shorting plug inserted in any of the sockets 94, the system will scan normally as described with reference to FIG. 1. If, however, one of the sockets 94 is shorted to the common line 92 by a shorting plug 106, the relay coil 98 will be energised and the contact sets 102, 104 closed, when the wiper 96 of the stepping switch 32 makes contact with the outlet 108 of the switch bank to which the shorted socket 94 is connected. Since the switch is stepping, the contact set 100 will remain closed.

The closing of the contact set 104 will maintain the operating current to the stepping switch operating coil 30, so that the switch will continue to step, even though there are no further shorting plugs 106. At the end of the stepping cycle, however, the contact set 100 will open to release the relay and cause contact sets 102, 104 to open. The switch will then cease to step and will await the next impulse from the pulse generator (not shown).

In FIG. 7 one possible arrangement is shown for modifying the pulse generator circuit of FIG. 1 so as to produce different pulse intervals at different steps in the scanning cycle, where the switching means is comprised of semi-conductor devices. Referring to FIG. 3 and the description thereof, it will be seen that zero volts appears on each column as it is scanned, the unscanned columns at any instant remaining at +6 volts. This fact is employed in the arrangement of FIG. 7 where 110 refers to a row contact element of the patchboard of FIG. 3. The row is associated with a row of sockets 112 which are isolated from the other sockets in each column and from each other. Plugs (not shown) containing resistances 114 and diode (not shown) are inserted into the sockets 112 to connect the column contact elements (not shown) to the row contact element 110 through the resistances 114 and diodes. (The diodes (not shown) are necessary to prevent interaction between the resistances.) The row contact element 110 is connected to the capacitor 12 which is thus connected through the resistances 114 (in turn) to the zero volts bus bar as the columns of the patchboard are scanned. The resistances 114 can have different values which thus determine a different rate of charge of the capacitor 12 at each step in the scanning cycle.

FIG. 8 shows how a second pulse can be obtained following a stepping pulse, to skip a column during scanning, when the switching means is comprised of semi-conductors. The circuit shown is based on FIG. 2 and the same reference numerals have been used where appropriate.

The arrangement requires one row on the patchboard as in the arrangement of FIG. 7. The row contact element is connected to the trigger electrode of a gate 120 which is normally open but is closed when the trigger electrode is connected to the zero volts bus bar. A pulse generator 122 operating to supply pulses at a high frequency (such as 5 kc./s.) is connected to one side of the gate 120, the pulses therefrom being transferred to the input of the pulse counting circuit (I, II . . . A, B, etc.) when the gate 120 is closed. Thus, by inserting a shorting plug into the socket of the aforementioned row corresponding to the column which it is desired to skip, the zero volts bus bar will be applied to the gate trigger electrode when the scanning reaches that column, thus causing a pulse to pass to the counting circuit from the generator 122. As soon as the scanning moves onto the next column, not having a shorting plug, the gate will block and the device will revert to its previous stepping rate.

In FIG. 9 there is shown an arrangement by which pulses can be produced continuously and applied to the input of the counting circuit of FIG. 2 after a selected column is reached in the scanning cycle, to reset the device to the beginning of the scanning cycle. The arrangement is similar to that of FIG. 8 in that a separate high frequency pulse generator 122 is employed. However pulses from this generator are applied to the input of the counting circuit via a gate 124 having two trigger electrodes 126, 128. The characteristics of the gate are such that when zero volts is applied to trigger electrode 126 the gate is switched into conduction, in which state it remains even though the zero volts are removed from the trigger electrode 126. On application of zero volts to gate 128 however the gate is switched into its non-conducting state.

To this end the trigger electrode 128 is permanently connected to the first column contact element of the patch board, while the other trigger electrode 126 is connected to the row contact element of the aforementioned row. It will be seen that by inserting a shorting plug into one of the sockets of this row, the gate 124 will be switched into conduction when the scanning reaches that column and the scanning will continue therefrom under action of the pulses from the generator 122 until it reaches the first column, when the gate will become non-conducting and the system will revert to its normal scanning rate until it reaches the shorted column again. The arrangement thus provides means for resetting the scanning system from any point in the scanning cycle.

FIGS. 10 and 11 are front and rear views of a 10 x 10 patchboard unit 130 mounted in a frame 132. Referring to FIG. 10 the socket holes 134 will be seen at the intersections and corners of a grid of white lines formed by printing or otherwise marking the front face of the patchboard. The rows are denoted by the numbers 1–10 while the columns are denoted by the letters A–K.

Referring to the rear view in FIG. 11 the ends of the row contact elements 136 will be seen protruding from the right edge of the unit while the ends of the column contact elements 138 will be seen protruding from the upper edge of the unit, as shown in the figure.

The patchboard unit is constructed from the similar layers of insulating material with the row contact elements sandwiched between one outer layer and the middle layer and the column contact elements sandwiched between the other outer layer and the middle layer. The underside of each layer is formed with upstanding studs as on the underside shown in FIG. 11, between and around which the U-shaped contact elements 136, 138 are located.

In FIG. 12 there is shown a complete control panel for a process such as a machine tool. The panel includes a 20 x 20 matrix formed by four 10 x 10 patchboard units 130 (see FIGS. 10, 11), in which the horizontal axis of the matrix constitutes the time axis and the vertical axis the "functions controlled." Thus as shown, at step 1, valve D is closed on both "Normal- and Blow runs." Likewise at step 4 valve C is opened on a "Normal run."

I claim:

1. An electrical programme device comprising, in combination;

a multiple socket patchboard having rows and columns of sockets and socket contact elements in at least two planes, each element engaging and electrically interconnecting the sockets forming a row or column and capable of being electrically connected to an element in another plane by inserting an electrical plug in one of the sockets and a scanning device for applying a potential in a step-by-step manner to the column contact elements of the multiple socket patchboard comprising, electrical pulse generating means, a pulse counting device for counting successive electrical pulses, switch means responsive to the counting device, and a common source of electrical potential, said switch means establishing an electrical signal path between the common source of potential and each column contact element in turn as successive pulses are counted by said counting device thereby to apply said potential to selected row contact elements which are connected to column contact elements.

2. An electrical program device as set forth in claim 1 wherein the electrical pulse generator means comprises a capacitor which is charged through a charging resistance and a source of electrical potential and a semi conductor junction responsive to the potential across the capacitor, said generator being triggered into conduction by the rising potential across the capacitor as the latter is charged and serving to rapidly discharge the capacitor when triggered into its conducting state, the falling voltage across the capacitor serving to extinguish conduction through the junction to permit the cycle to repeat indefinitely.

3. An electrical program device as set forth in claim 2 in which the charging resistance is at least in part variable.

4. An electrical program device as set forth in claim 1 wherein the counting device and switch means comprises an electromagnetically operable stepping switch which is stepped by pulses from the pulse generator, the moving contact of said switch being connected to the source of potential and the outlets of the switch being separately connected to the column contact elements.

5. An electrical program device as set forth in claim 4 wherein the stepping switch includes an operating coil and a normally closed contact set which is opened each time the switch steps from one position to the next and the operating coil is connected in series with said contact set and a silicon controlled rectifier across a supply of operating current for the operating coil, the pulses from the pulse generator serving to fire the silicon controlled rectifier.

6. An electrical program device as set forth in claim 1 wherein the counting device comprises a plurality of semi conductor junctions arranged in the form of a ring counting circuit having an input to which the pulses from the pulse generator are supplied.

7. An electrical program device as set forth in claim 6 wherein the counting device comprises a first ring counter containing five counting stages and a second ring counter containing four counting stages and each counting stage in each ring has an output.

8. An electrical program device as set forth in claim 7 further comprising a decoder having twenty outputs which is responsive to the outputs from the two ring counters forming the counting device, each of the twenty outputs being selected by a unique combination of one output from one ring counter and one output from the other ring counter.

9. An electrical program device as set forth in claim 8 wherein the decoder comprises four groups of semi conductor junctions, each group comprising a single semi conductor junctions connected in series with five semi conductor junctions, the four groups being connected in parallel across a supply of operating current and the trigger electrodes of the first semi conductor junctions in each of the five groups being connected to the output from the first stage in the ring of five counter, the trigger electrodes of the second junctions in the groups of five being connected to the output of the second stage in the ring of five counter and the third junctions being connected to the output of the third stage, the fourth junctions being connected to the output of the fourth stage and the fifth junctions being connected to the output of the fifth stage of the ring of five counter and the trigger electrodes of the fourth series connected junctions being connected to the outputs of the four stages of the ring of four counter.

10. An electrical program device as set forth in claim 2 which further comprises a plurality of resistors selectively connectable in turn in series with and to form part of said charging resistor as the device steps around the scanning cycle.

11. An electrical program device as set forth in claim 10 wherein said selectively connectable resistors are individually adjustable thereby to adjust and vary the charging rate for the capacitor at each step of the scanning cycle and thereby to vary the interval between scanning steps.

12. An electrical program device as set forth in claim 10 wherein the selectively connectable resistors are connected to outputs of a multiway stepping switch operated in a step-by-step manner by the pulses from the pulse generator, the ends of the resistors remote from said outlets being connected to a common junction and the moving contact of the switch being connected to a second junction and the two junctions being connected in the charging circuit for the capacitor.

13. An electrical program device as set forth in claim 10 wherein one end of each of the said selectively connectable resistors is connected to a common junction and the other ends of each of said resistors are connected to the column contact elements of the patchboard, the scanning action applying a set potential to each column contact element in turn during the scanning cycle to select each of said resistors in turn, said common junction being connected to said capacitor to effect the charging rate of said capacitor.

14. An electrical program device as set forth in claim 2 which includes means for generating a second pulse immediately subsequent to a previously produced pulse from said pulse generator with a selected one or selected ones of the column contact elements, means for applying said second pulse to said counting device and switch means to cause the scanning device to step to the following step thus skipping over the selected column or columns.

15. An electrical program device as set forth in claim 14 wherein the counting device and switch means comprises an electromagnetically operable stepping switch whose operating coil is connected in series with a normally closed contact set which opens each time the switch steps and a silicon controlled rectifier across a supply of operating current and wherein said means for generating a second pulse comprises a multi way section on said stepping switch having an outlet for each column contact element and a single moving contact, and shorting plug means is provided between selected ones of said outlets and a junction and said moving contact is connected to one electrode of the rectifier and said junction is connected to the other electrode of said rectifier to short said rectifier when said selected column is scanned, to maintain operating current to the coil of said stepping switch to cause the latter to continue to step until the moving contact ceases to make contact with an outlet connected to said junction.

16. An electrical program device as set forth in claim 14 comprising a pulse generator and a gate by which the pulses from the pulse generator are supplied to the input to the counting device, the gate being controlled into a conducting state by the potential change on the selected column contact element when the latter is scanned.

17. An electrical program device as set forth in claim 2 comprising means to generate additional pulses to operate the counting device and switch means repetitive until the scanning device has scanned all the column contact elements following a selected one of column contact elements and has reset in readiness to begin scanning from the first column contact element again.

18. An electrical program device as set forth in claim 17 wherein the pulse generator for generating said additional pulses operates at a higher frequency than the first mentioned pulse generating means.

19. An electrical program device as set forth in claim 17 wherein the counting means and switch means comprises an electromagnetically operable stepping switch whose operating coil is connected in series with a normally closed contact set which opens each time the switch steps and a silicon controlled rectifier across a source of operating current and wherein said means for generating the additional pulses comprises a multi way bank on said switch having outlets corresponding in number to the column contact elements of the patchboard and a single moving contact, and shorting plug means for connecting one of said outlets to an operating coil of a relay having two normally opening contact sets, the operating coil of said relay being connected through a normally closed contact set on said stepping switch which is opened when the switch reaches its first position to one side of a supply of operating current, said moving contact being connected to the other side of said supply of operating current, one of said normally open relay contact sets serving to connect said relay coil to said other side of the operating current supply independently of the stepping switch when the relay is operated, and said other normally open relay contact set serving to short circuit the silicon controlled rectifier while the relay is operated.

20. An electrical program device as set forth in claim 17 which comprises a pulse generator and a gate which is caused to conduct and supply pulses from the generator to the counting device in response to the change in potential on the selected column contact element as it is scanned and is caused to switch into its non-conducting state in response to the change in potential on the first column contact element as it is scanned, cut off the pulses from the generator and allow the scanning device to begin stepping in the normal way, under the action of the pulses from the first mentioned pulse generator.

21. An electrical program device as set forth in claim 1 wherein the multiple socket patchboard comprises three similar layers of insulating material having a regular pattern of aligned holes through the three layers, elongate row contact elements sandwiched between the middle layer and one outside layer of insulant and elongate column contact elements sandwiched between the middle layer and the other outside layer of insulant and the contact elements in each layer being located and aligned by studs formed on the underside of each layer of insulant.

References Cited

UNITED STATES PATENTS

| | | | |
|---|---|---|---|
| 3,064,237 | 11/1962 | Schubert | 340—166 |
| 3,156,772 | 11/1964 | Freericks et al. | |
| 3,181,129 | 4/1965 | Freedman | 340—166 X |
| 3,205,469 | 9/1965 | Frank et al. | |
| 3,320,431 | 5/1967 | De Bough et al. | 307—141.4 X |
| 3,355,710 | 11/1967 | Schubert | 340—166 |

ROBERT K. SCHAEFER, Primary Examiner

T. B. JORKE, Assistant Examiner

U.S. Cl. X.R.

340—166